US008908294B2

(12) United States Patent
Nakano (10) Patent No.: US 8,908,294 B2
(45) Date of Patent: Dec. 9, 2014

(54) CATADIOPTRIC OPTICAL SYSTEM WITH HIGH NUMERICAL APERTURE

(75) Inventor: Masatsugu Nakano, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/475,481

(22) Filed: May 18, 2012

(65) Prior Publication Data

US 2013/0308181 A1 Nov. 21, 2013

(51) Int. Cl.
G02B 17/00 (2006.01)
G02B 21/02 (2006.01)
G02B 21/04 (2006.01)
G02B 17/08 (2006.01)

(52) U.S. Cl.
CPC ............ G02B 17/0824 (2013.01); G02B 21/04 (2013.01); G02B 17/0856 (2013.01)
USPC .......................................... 359/730; 359/656

(58) Field of Classification Search
CPC .............. G02B 17/08–17/086; G02B 17/0892; G02B 17/0896
USPC ................. 359/364–366, 368–398, 726–736, 359/656–661
See application file for complete search history.

(56) References Cited

U.S. PATENT DOCUMENTS

| 6,600,608 B1 | 7/2003 | Shafer et al. |
| 7,646,533 B2 | 1/2010 | Chuang et al. |
| 7,884,998 B2 | 2/2011 | Armstrong |
| 2004/0240047 A1* | 12/2004 | Shafer et al. .................. 359/366 |
| 2007/0236674 A1* | 10/2007 | Shafer et al. .................... 355/60 |

FOREIGN PATENT DOCUMENTS

WO 2009046137 A1 4/2009

OTHER PUBLICATIONS

Huang et al.,"Achromatic Catadioptric Microscope Objective in Deep Ultraviolet with Long Working Distance", Novel Optical Systems Design and Optimization VII, Proc. of SPIE, vol. 5524, pp. 125-133.

* cited by examiner

Primary Examiner — Alicia M Harrington
Assistant Examiner — Cara Rakowski
(74) Attorney, Agent, or Firm — Canon USA Inc. IP Division (57) ABSTRACT

An optical system includes a first optical group configured to form, at a first intermediate image plane, a first intermediate image of an object disposed at an object plane; a second optical group and a third optical group configured to form, at an image plane, a final image of the object based on the first intermediate image. The first optical group consists of a solid lens having a first surface and a concave second surface facing the first surface; the solid lens is configured to collect light originated at the object and to reflect thereinside at least twice the collected light. The second optical group includes at least one mangin mirror and the third optical group includes a plurality of lenses. The first, second and third optical groups can appropriately control axial chromatic aberration and Petzval curvature, so that imaging with high NA illumination may be performed.

14 Claims, 6 Drawing Sheets

T: transparent region of surfaces 104 & 106
R: reflective region of surfaces 104 & 106

CATADIOPTRIC OPTICAL SYSTEM WITH HIGH NUMERICAL APERTURE

FIELD

The disclosure of this application relates generally to optical imaging; and in particular it relates to a catadioptric optical system usable as an objective optical system in imaging applications, such as microscopy or lithography, for example.

BACKGROUND

Optical systems used in microscopy or lithography and capable of imaging small structures down to the scale of a few microns or less on the surface of an object are well known. To produce a good image, an optical system must collect enough light reflected from (or transmitted through) the object, separate the details in the image, magnify the image, and render the details visible to the human eye or an optical detector. The numerical aperture (NA) of the optical system is a measure of its ability to gather light and resolve fine object details at a fixed object distance. The optical system's ability to resolve the fine details and produce a good image is hindered by optical aberrations. Most aberrations are caused by artifacts arising from the interaction of light with optical elements (lenses or mirrors). In particular, chromatic aberrations arise from variations in the refractive indices of the optical elements when interacting with the wide range of frequencies found in the spectrum of light, in particular when imaging with visible light. In general, optical aberrations introduce optical defects in the features of an image being observed through an optical system, thereby degrading the optical system's performance.

In an optical microscope, the optical system closest to the object being imaged is referred to as the objective optical system or simply the "objective"; it forms a real, inverted, magnified image of the object. This image is referred to as an intermediate image and resides in the plane of the field stop of the eyepiece. An objective's numerical aperture influences a number of factors including resolving power, working distance, field of view, and the amount of light collected by the objective. The working distance is the space between the front most surface of the objective optical system and the surface the object closest thereto. The working distance determines what is referred to as the "object space", i.e., the space between the entrance surface of the first lens in the objective and the object plane. The field of view (FOV) is the area of the object, at the working distance, seen through the objective at one time. The resolving power is the ability of an imaging device to separate (see as distinct) points of an object that are located at a small angular distance from each other. NA influences both the resolving power of the objective optical system and the amount of light that it can collect. Generally, the NA represents the range of angles for which light can be delivered to or collected from an object being imaged using a specific objective design. While many factors must be considered when designing objective optical systems, the ultimate goal is to reduce the number of aberrations.

One of the problems arising from imaging with high NA illumination is chromatic aberration. As it is known to persons having ordinary skill in the art, chromatic aberrations arise from variations in the refractive index of material when interacting with different wavelengths of light. Specifically, for example, when white light passes through a lens, the component wavelengths are refracted according to their frequency. In a positive lens, blue light is refracted to the greatest extent followed by the green and red light components. The inability of a lens to bring all of the colors into a common focus results in a slightly different image size and focal point for each predominant wavelength component. This phenomenon is known as axial chromatic aberration. Additional lateral chromatic aberration may occur when white light is focused off-axis or when the white light source is placed even slightly off-axis. Correcting chromatic aberration, in particular, across the visible spectrum including wavelengths ranging from approximately 400 nm (nanometers) to 700 nm is particularly challenging. Normally, a microscope can be thought of as a positive lens. In that sense, the power of the positive lens produces what is known as "undercorrected" axial chromatic aberration. To compensate for it, overcorrected axial chromatic aberration is intentionally generated by adding specially designed optical elements within the microscope's optical system.

Another problem related to imaging with high NA illumination is the possibility of total internal reflection (TIR). Specifically, TIR can occur when light having a large angle of incidence is refracted, especially, in a lens-air interface as discussed infra with respect to FIG. 2. TIR can be prevented by using a coupling fluid whose index of refraction matches as closely as possible that of the front most surface of the objective optical system.

In addition, image field curvature is another imaging aspect to be considered. Specifically, since an image of a sample is generally captured by a sensor, such as CCD (charged coupled device) or CMOS (complementary metal oxide semiconductor) sensor, which has a flat surface, a flat image is required at the plane where the sensor is located. Generally, however, since a microscope can be regarded as a positive lens, the power of the positive lens generates an image having an inward-curving field. The curvature of the resulting image is known as the Petzval curvature. To compensate for inward Petzval curvature, an outward-curving field is intentionally generated by adding specially designed optical elements within the microscope's optical system. Specifically, using a concave mirror has been known to be an effective method for compensating the inward Petzval curvature. It is clear, therefore, that correction of aberrations can a considerable number of lens elements to the objective optical system. This significant increase in the number of optical elements often results in a tight fit and difficult to align, oversized objective system.

In consideration of the above background, previous attempts to increase the numerical aperture and minimize aberrations have been made. International patent application PCT/US2008/078493, published as WO 2009/046137 A1, by Hwang et al., (herein "Hwang") discloses, for example, an optical imaging system with a catadioptric objective that is claimed to minimize chromatic aberration and optimize the correction of Petzval curvature, so that an image with flat Petzval field may be obtained. The NA in Hwang's optical imaging system, however, is less than 1.

U.S. Pat. No. 7,646,533B2 to Chuang et al. (herein "Chuang") discloses various embodiments of a small catadioptric objective with ultra-high NA. The objective includes a lens group having at least one focusing lens that forms an intermediate image. The objective further includes at least one field lens located in proximity to the intermediate image, and a catadioptric system positioned to receive the intermediate image from the at least one field lens. The catadioptric system includes at least one Mangin element and can include a meniscus lens element. Although Chuang's system is termed "ultra-high NA", NA is less than 1.

U.S. Pat. No. 6,600,608 to Shafer et al., (herein "Shafer") discloses a catadioptric objective that forms two intermediate images. The objective includes two refractive partial objectives and one catadioptric partial objective. The objective includes a first partial objective, a first intermediate a image, a second partial objective, a second intermediate image, and a third partial objective. At least one of the partial objectives is purely refractive. One of the partial objectives is purely refractive and one is purely catoptric. According to Shafer, the catoptric partial objective carries the burden of Petzval sum reduction or field flattening. This relieves the refractive partial objective from the need for beam contractions and expansions by negative and positive lens groups. However, the objective disclosed by Shafer is a projection objective limited to be used in a microlithography projection exposure apparatus that operates primarily in the deep ultra-violet (DUV) region of the electromagnetic spectrum.

Lastly, U.S. Pat. No. 7,884,998 to J. Joseph Armstrong (herein "Armstrong") discloses a catadioptric microscope objective employing immersion liquid for use in broadband microscopy. The objective receives light energy from a light energy source configured to provide light energy in a wavelength range of approximately 480 to 660 nanometers, employs a Mangin mirror arrangement in conjunction with an immersion liquid to provide a numerical aperture in excess of 1.0 and a field size in excess of 0.05 millimeters. As acknowledged by Armstrong, problems with immersion objectives employed within immersion imaging systems include the inability to resolve the image in the presence of either low wavelength or broad wavelength range light energy, or in the presence of different types of illumination and imaging modes. Further, immersion techniques cannot be universally employed with objectives available in standard microscopes.

Therefore, in spite of the advances attained by the present state of the art, currently available objectives do not allow imaging over a large FOV. To the best of the inventor's knowledge, currently available immersion objectives can at most offer a NA of approximately 1.3, a FOV no higher than approximately 1 millimeter, and wavefront R.M.S. equal to or less than 70 mλ (milli-lambda). No immersion objectives are currently known to the inventor herein that can simultaneously support broad wavelengths in the spectral range of approximately 400 to 700 nm, exhibit large FOV sizes, accept light with high NAs equal to or greater than 1.60, and generate wavefronts with R.M.S. errors equal to or less than 40 mλ.

SUMMARY

In accordance with at least one disclosed example, the instant disclosure provides an optical system comprising: a first optical group configured to form, at a first intermediate image plane, a first intermediate image of an object disposed at an object plane; a second optical group and a third optical group configured to form, at an image plane, a final image of the object based on the first intermediate image. The first, second and third optical groups are arranged in order from the object plane to the image plane along an optical axis of the optical system so that during operation the first to third optical groups image radiation from the object plane to the image plane to form the final image. The first optical group consists of a solid lens having a first surface and a concave second surface opposite to the first surface; the solid lens is configured to collect light originated at the object and to reflect thereinside at least twice the collected light. The second optical group includes at least one mangin mirror and the third optical group includes a plurality of lenses. An immersion fluid is provided in a space between the object plane and the first surface of the solid lens. Advantageously, the numerical aperture is greater than 1.3, the field of view size (field size) is larger than 6 mm, and wavefronts with an RMS error as low as 40 mλ can be achieved.

Other modifications and/or advantages of present invention will become readily apparent to those skilled in the art from the following detailed description in reference to the drawings.

DETAILED DESCRIPTION

In the following description, reference is made to the accompanying drawings which are illustrations of embodiments in which the disclosed optical system may be practiced. It is to be understood, however, that those skilled in the art may develop other structural and functional modifications without departing from the novelty and scope of the claims appended to the instant disclosure.

In referring to the description, specific details are set forth in order to provide a thorough understanding of the examples disclosed. In other instances, well-known methods, procedures, components and circuits have not been described in detail as not to unnecessarily lengthen the present disclosure. Some embodiments of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

As will be appreciated by those skilled in the art, the present examples may be embodied as a system, an apparatus, a method of using the system, or even a computer program product embodied in tangible computer-readable media.

Accordingly, some examples may take the form of an entirely hardware embodiment, entirely software embodiment (including firmware, resident software, micro-code, etc.), or an embodiment combining software and hardware aspects that may all generally be referred herein as a "circuit", "module" or "system". Further, some embodiments may take the form of a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowcharts and/or block diagrams disclosed herein.

As used herein, a plane where an object to be imaged is located will be referred to as an "object plane", and a plane where an image of the object is formed will be referred to as an "image plane". When considering an entire image pickup apparatus that includes an optical system and an image pickup element, the image plane corresponds to a plane located at the back focal plane of the optical system. In addition, the side of a lens where the object to be imaged is located is interchangeably referred to as the "object-plane side", "object side", or "front side" of the lens; and the side of the lens where the image is formed is interchangeably referred to as the "image-plane side", "image side" or "back side" of the lens.

Figure 1:
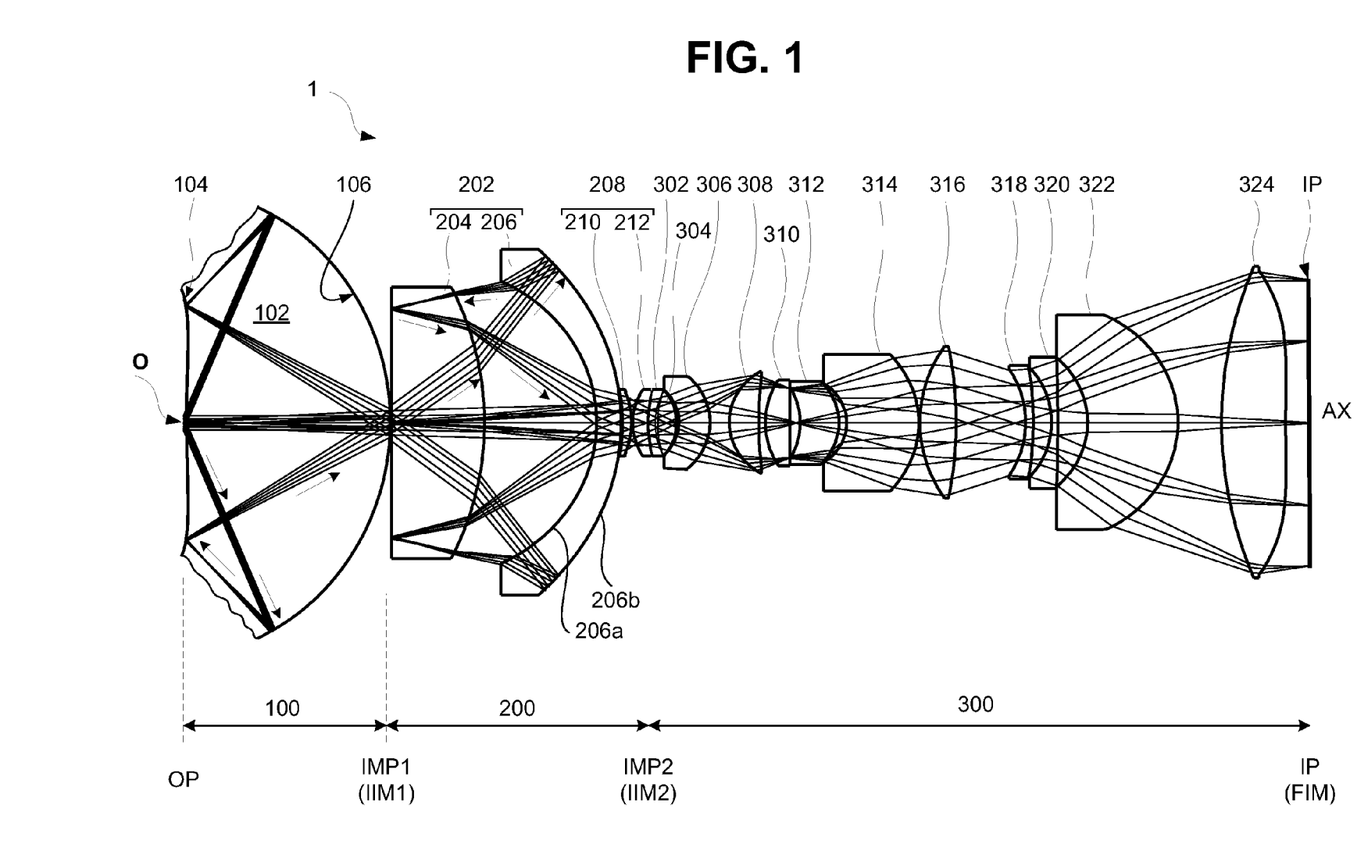
FIG. 1 illustrates an exemplary optical system including first, second and third optical groups, in accordance with a first aspect of the present invention.

FIG. 1 illustrates an optical system 1 that can be used as an objective optical system of a microscope in accordance with a first aspect of the present invention. The optical system 1 includes both reflective and refractive elements, i.e., it is a catadioptric optical system, including a first optical group 100, a second optical group 200 and a third optical group 300 aligned along an optical axis AX. The first optical group 100 is configured to form, at a first intermediate image plane IIMP1, a first intermediate image IIM1 of an object O located at an object plane OP. The second optical group 200 is configured to form, at a second intermediate image plane IIMP2, a second intermediate image IIM2 based on the first intermediate image IIM1. The third optical group 300 is configured to form, at a final imaging plane IP, a final image FIM based on the second intermediate image IIM2. Incidentally, it can be said that the first optical group 100, the second optical group 200 and the third optical group 300 are arranged in this order from an object-plane side to an image-plane side. The terms "first", "second", "third", etc., as used herein, denote a relative position of the optical elements or groups thereof; and this relative position is defined by the order in which light originated at the object O travels from the object plane OP to the final image plane IP. The image plane IP corresponds to an imaging surface of a solid-state image sensor (photoelectric conversion element) receiving an image such as a CCD sensor or a CMOS sensor when a photographic optical system of a video camera or a digital camera is used to detect the image of the object. In addition, the image plane IP may correspond to a film surface when a photographic optical system of a silver-halide film camera is used.

The first optical group 100 consists of a solid lens 102 which has a first surface 104 and a second surface 106, respectively on the object side and image side thereof. The second optical group 200 includes a Mangin group 202, and a lens group 208. The Mangin group 202 includes a first Mangin mirror 204 and a second Mangin mirror 206; and the lens group 208 includes a first lens 210 and a second lens 212. The solid lens 102, the first Mangin mirror 204 and the second Mangin mirror 206 include a non-illustrated central region thereof which is not reflective and allows light to be transmitted therethrough without interruption. The third optical group 300 includes a group of 12 lenses 302, 304, 306, 308, 310, 312, 314, 316, 318, 320, 322 and 324 aligned in this order from the object side to the image side.

Figure 2:
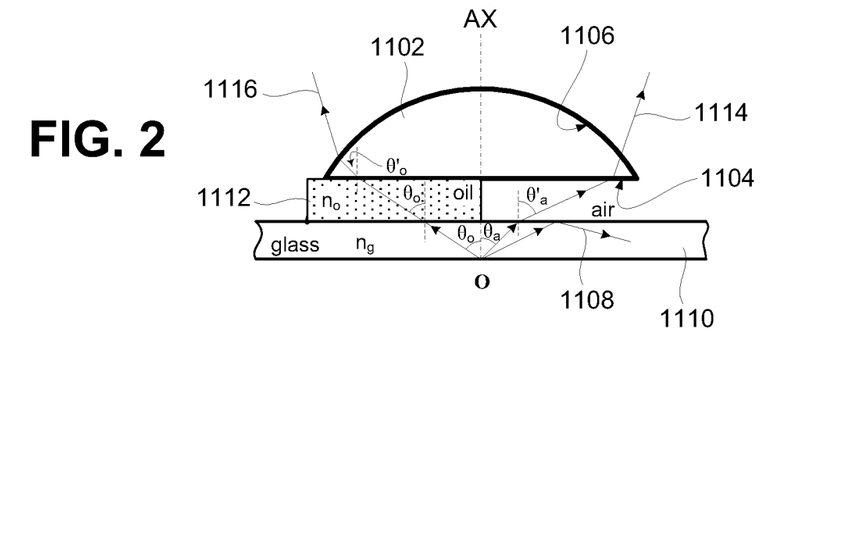
FIG. 2 illustrates a conventional objective optical system consisting of a single objective lens.

The specific structure and function of each group will now be described. In operation, the first optical group 100 is configured to optimize the light-collecting capability of the optical system, by preventing total internal reflection (TIR) and providing a high numerical aperture equal to or greater than 1.60. To better illustrate the structure and function of the first optical group 100, which consist of the solid lens 102, FIG. 2 illustrates a diagram of a simplified objective optical system 1100 consisting of a single objective lens 1102 having a first surface 1104 and a second surface 1106. The right side of FIG. 2 illustrates the negative effects that TIR plays in the light-gathering capability of the objective lens 1102; and the left side of FIG. 2 illustrates an increased light-gathering capability of the objective lens when the lens is immersed in an immersion fluid (oil). Specifically, as shown in FIG. 2, when an object O is placed under a thin cover glass 1110, useful rays 1114 originating at the object O pass through the thin cover glass 1110 at an angle $\theta_a$, and then travel through air at an angle $\theta'_a$ to impinge on the first surface 1104 of the lens 1102. Due to refraction at the glass-air interface, rays 1108 also originating at the object O but making an angle larger than $\theta_a$ are reflected at the glass-air interface of the thin cover glass 1110 due to TIR. Thus, rays 1108 do not reach the objective lens 1102. A situation where the object O is placed under a cover glass is predominantly used in the field of physiology where manipulation of living cells is performed in an immersion fluid such as water. In this and other situations, the cover glass is often used as a physical barrier to avoid contamination of the sample. Thus, where a cover glass used to protect the sample, it is advantageous to avoid TIR in the object space.

The negative effects of TIR can be partially overcome by using an immersion fluid whose index of refraction matches as closely as possible the refractive index of the cover glass. Specifically, as illustrated on the left side of the optical axis AX in FIG. 2, a layer of immersion fluid 1112 (oil) may be used between the cover glass 1110 and the objective lens 1102. In this case, rays of light 1116 originated at the object O at an angle $\theta_o$ (larger than $\theta_a$) can be transmitted through the immersion fluid without undergoing TIR, and can be then captured by the objective lens 1102 at the same angle $\theta_o$. More specifically, since the refractive index $n_o$ of the immersion fluid 1112 is selected to match the refractive index $n_g$ of the cover glass 1110, the rays of light 1116 originating at object O at the angle $\theta_o$ propagate through the glass-oil and oil-lens interfaces at substantially the same angle $\theta_o$ without undergoing TIR. In this manner the light originated at the object O can be collected by the objective lens 1102 at an angle $\theta'_o$, which is substantially equal to the incident angle $\theta_o$. Accordingly, the light-gathering capability of the objective optical system is thus increased by matching the refractive index in the object space of the microscope to the refractive index of the cover glass 1110 and/or the objective lens 1102. This positive effect can be particularly advantageous when the object O is placed directly in the immersion fluid (without the cover glass), and the objective lens 1102 is designed to study the object O submerged in immersion fluid. A measure of the light-gathering capability of the lens 1102 is given by the numerical aperture, which can be defined by Equation (1):

$$NA = n_o \sin \theta_m \quad \text{Equation (1)}$$

where $n_o$ is the refractive index of the medium (air, oil, water, etc.) in the object space, and $\theta_m$ is the half-angle of the maximum cone of light picked-up by the first objective lens. Expressed in another way, $\theta_m$ is the angle formed between the optical axis AX of the lens and a marginal ray that originates at the object O and is captured by the objective lens. The largest angle of the maximum cone of light picked-up by the objective lens in an angle that does not lose light and does not generate significant aberrations, either.

The resolution R of a microscope's objective optical system is given by Equation (2):

$$R = 0.61(\lambda/NA) \quad \text{Equation (2)}$$

where $\lambda$ is the wavelength of the light being used for illumination, NA is the numerical aperture of the microscope on the object space as defined in Equation (1), and 0.61 is derived from the Rayleigh criterion. From equations 1 and 2, therefore, it can be appreciated that in order to achieve high resolution R, either the wavelength can be reduced or the numerical aperture should be increased, and more preferably both should be attempted. However, since radiation sources with very narrow wavelengths are costly and delicate for most practical applications, efforts to increase the resolution R of a microscope have been typically directed to increasing the NA. Specifically, since a high NA can yield a microscope objective with high resolution R and capable of resolving ever smaller features in an object, each of the references discussed in the Background section of this application has made an attempt to increase the NA and minimize aberrations.

As disclosed by Armstrong (discussed supra), increasing the refraction index $n_o$ in the object space, by using an immersion fluid, is one known technique for obtaining a larger NA and for enhancing the light-gathering ability of an objective optical system. Accordingly, as discussed above, it is beneficial that the object space be immersed in an immersion fluid with an index of refraction $n_o > 1$ instead of air whose index of refraction is ~1. However, using an immersion fluid in the object space cannot in and of itself overcome other limitations, such a chromatic aberration and limited field of view.

Therefore, as disclosed in the present invention, the optical system 1 illustrated in FIG. 1 is specifically designed to not only provide a high NA equal to or greater than 1.60, but also to correct the various aberrations that occur when light in a broad wavelength range of 400 to 700 nm is collected at a high angle $\theta_m$. To that end, the solid lens 102 has been specifically designed so that light transmitted therethrough can produce the first intermediate image IIM1 with an outward Petzval curvature; and the second optical group 200 can produce the second intermediate image IIM2 with an outward Petzval curvature and overcorrected axial chromatic aberration. And the third optical group 300 is designed to generate undercorrected chromatic aberration and inward Petzval curvature, so as to compensate for the overcorrected chromatic aberration and outward Petzval curvature generated by the second group.

More specifically, each of the first surface 104 and the second surface 106 respectively include a transparent portion substantially centered on the optical axis of the lens and a reflective portion that surrounds (concentric to) the transparent portion. The reflective portions of the first and second surfaces of the solid lens 102 may be formed by optical coating, for example. Lenses having partially coated surfaces are considered to be well known to persons having ordinary skill in the art. Thus, specific details concerning coating materials or coating techniques are not discussed herein. Importantly, however, the solid lens 102 and its surfaces thereof may preferably be designed to operate either in dry or wet environments. More specifically, at least the first surface 104 of the solid lens 102 may be designed to work either exposed to air or submerged in an immersion fluid. To that end, the first surface 104 should be coated with a highly reflective material which material should be resistive to corrosion. A refractive index of the immersion fluid may preferably be selected so as to match the refractive index of the solid lens 102 and/or the coating of the first surface 104.

Figure 3:
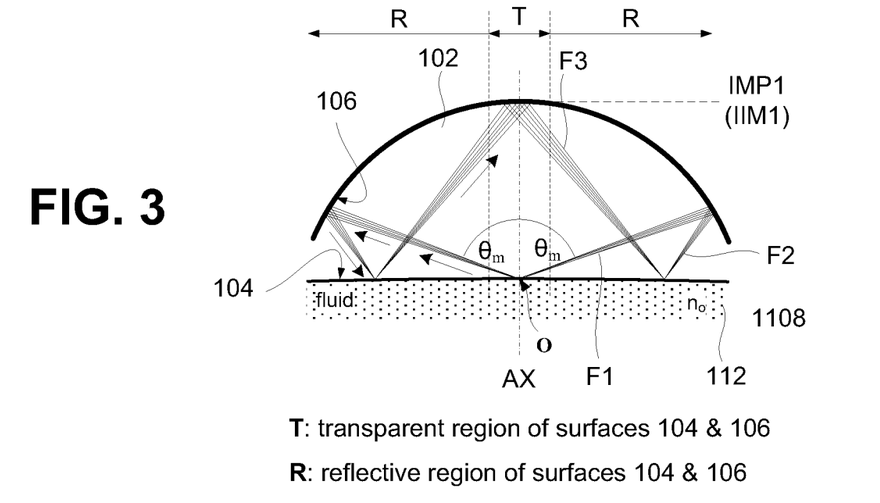
FIG. 3 illustrates a solid lens of the first optical group and light-collecting capability thereof, in accordance with the first aspect of the present invention.

FIG. 3 illustrates the solid lens 102 of the first optical group and its light-collecting capability thereof. As used herein, a solid lens is not limited to a lens made of a single solid material or made of a single solid element. That is, the solid lens 102 may be obtained by cementing two or more lens elements of the same or different materials. In FIG. 3, rays of collected light F1 originated at the object O and entering the lens 102 at an angle $\theta_m$ pass through a transparent region T of the first surface 104 to impinge first onto a reflective region R the second surface 106; the rays of collected light F1 are then reflected as collected light F2 towards the first surface 104. From reflective region R of the first surface 104, the collected light F2 is reflected forward as rays of collected light F3 towards the first intermediate image plane IMP1, which is located near (in the vicinity of) the vertex of solid lens 102 and orthogonal thereto. At the first image plane IMP1, the reflected rays of collected light F3 are combined to from the first intermediate image IIM1. Accordingly, it can be said that the first optical group 100 consists of a solid lens 102 with two reflective surfaces (R in 104 and 106) thereinside and a transmissive portion T in its center region thereof. Due to these two reflective surfaces (R 104 and 106), light originated at the object O undergoes at least two reflections inside the solid lens 102 and forms the intermediate image IIM1 with an outward Petzval curvature and minimized axial chromatic aberration. Specifically, the concave curvature of the second surface 106 in lens 102 is designed to intentionally generate outward Petzval curvature, which can be corrected with inward Petzval curvature generated by the third optical group 300. The object O, which is preferably submerged in an immersion fluid 112, is located within a predetermined distance from the first surface 104. The predetermined distance from the first surface 104 to the object O establishes what is referred to as the working distance or object space of the objective optical system in a microscope. The NA on the object space is determined by the angle $\theta_m$ as defined by Equation (1).

As previously stated, a microscope's objective optical system may be considered as being equivalent to a positive lens. In which case, the final image formed on the image plane IP (see FIG. 1) by the optical system 1 would generate an image with an inward-curved field due to Petzval curvature. The so-called Petzval sum is given by Equation (3), where $n_i$ is the index of refraction and $f_i$ is the focal length of the i-th optical element. Petzval radius of curvature is given by a displacement $\Delta x$ of an image point at a height $Y_i$ on the Petzval surface from the paraxial image plane of an image of a plane object produced by an optical system of m lens elements. $\Delta x$ is given by Equation (4).

$$\sum_{i=1}^{m} P_i = \sum_{i=1}^{m} \frac{1}{n_i f_i} \quad \text{Equation (3)}$$

$$\Delta x = \frac{Y_i^2}{2} \sum_{i=1}^{m} P_i \qquad \text{Equation (4)}$$

Therefore, referring back to FIG. 3, the solid lens 102—with its first surface 104 being substantially planar and its second surface 106 being concave towards the object plane—is substantially formed of a plano-convex lens which is configured to generate the first intermediate image IIM1 with an outward Petzval curvature. This allows the optical system 1 to enhance its light capturing capability at the same time as to increase its objective FOV. Here it should be noted that, in accordance with Numerical Example 1 (see Table 3) and by using Equation (3), the Petzval sum of the first optical group 100 was found to be −0.0068 in an embodiment of the present invention.

Axial (otherwise known as the longitudinal component of) chromatic aberration L is given by Equation (5).

$$L = -\frac{1}{u_k'^2} \sum_{i=1}^{m} \frac{h_i^2}{f_i V_i} \qquad \text{Equation (5)}$$

Where $h_i$ is the paraxial marginal ray height, $V_i$ is the Abbe number, and $u'_k$ is the paraxial ray angle on the image plane. Axial chromatic aberration generated in the first optical group is noticeable when light pass through the second surface 106 after being reflected on the first surface 104. More specifically, at the first intermediate image plane IMP1, the light is collimated and focused so that the paraxial marginal ray height is almost zero, which means that axial chromatic aberration is low or substantially negligible. However, because of the specific concave design of the solid lens 102, non-paraxial rays forming the first intermediate image IIM1 at the first intermediate image plane IMP1 still generate certain amount of axial aberration. Accordingly, it can be said that the first optical group 100 forms the first intermediate image IIM1 at the first intermediate image plane IMP1 with an overcorrected axial chromatic aberration and an outward Petzval curvature.

Now the structure and function of the second optical group 200 is explained in detail. Referring back to FIG. 1, the Mangin group 202, consisting of the first Mangin mirror 204 and the second Mangin mirror 206, is configured to generate an outward Petzval curvature, and the lens group 208 consisting of the first lens unit 210 and the second lens unit 206 is configured to generate overcorrected chromatic aberration. Specifically, light arriving at the first intermediate image plane IMP1 passes through a transmissive portion of the first Mangin mirror 204, is reflected on the reflective surface of the second Mangin mirror 206, and the reflected light again enters the first Mangin mirror 204. Next, from the reflective surface of the first Mangin mirror 204, light is reflected towards a transmissive portion of the second Mangin mirror 206 in a central portion thereof. The light passing through the transmissive portion of the second Mangin mirror 206 now proceeds through the lens group 208. The first lens 210 and second lens 212 of the lens group 208 focus light onto the second intermediate image plane IMP2 to form the second intermediate image IIM2 therein. Notably, one of the functions of the Mangin group 202 is to further increase an outward tendency of the Petzval curvature already provided by the first group 100, and to generate overcorrected chromatic aberration. Specifically, the second Mangin mirror 206 has a concave shape facing towards the object plane and includes a first surface 206a and a second surface 206b. The concave shape of the first surface 206a creates the overcorrected axial chromatic aberration, and the concave shape of the second surface 206b generates the outward Petzval curvature. In accordance with Numerical Example 1 (see Table 3) and by using Equation (3), the Petzval sum for the second optical group 200 was found to be −0.0053 in an embodiment of the present invention.

The third group 300 includes a plurality of optical lenses (twelve lenses are shown in the first embodiment) and is configured to magnify the second intermediate image IIM2 to form the final image FIM at the final imaging plane IP. The lenses in the lens group 300 are not limited to any particular shape or order, but it is preferred that the third optical group 300 as a whole generates an inward Petzval curvature sufficient to compensate and correct the outward Petzval curvature generated by the first optical group 100 and second optical group 200. In addition, it is preferred that the third optical group 300 as a whole generates undercorrected axial chromatic aberration sufficient compensate and correct the overcorrected axial chromatic aberration generated by the second optical group 200. In simulations performed by the inventor, based on data shown in Table 1 (corresponding to numerical Example 1) and by using Equation (3), the Petzval sum of the third optical group 300 was found to be 0.012. Accordingly, persons of ordinary skill in the art will appreciate that the inward (positive) Petzval curvature of the third optical group 300 effectively compensates for the outward (negative) Petzval curvature of the first optical group 100 and that of the second optical group 200.

In summary therefore, in the optical system 1, the first optical group 100 is configured to generate outward Petzval curvature and minimize axial chromatic aberration; the second optical group 200 is configured to generate outward Petzval curvature and overcorrected axial chromatic aberration; and the third optical group 300 is configured to generate inward Petzval curvature and undercorrected axial chromatic aberration. In this manner, the first to third optical groups 100, 200 and 300 can be independently and individually designed without strict restrictions in terms of control of aberrations, but when assembled together as a whole the three optical groups are designed to compensate each other's aberrations to obtain an optimized final image with an exceptionally large FOV and substantially free of aberrations. More specifically, the intentionally generated outward Petzval curvature of the first optical group 100 and second optical group 200 are compensated and corrected by the inward Petzval curvature of the third optical group 300. Similarly, the overcorrected axial chromatic aberration intentionally permitted in the first and second optical groups is strategically compensated and corrected with the under corrected axial chromatic aberration of the third optical group. The relationship of each optical group of the optical imaging system 1 to Petzval curvature and axial chromatic aberration is summarized in Table 1.

TABLE 1

Summary of optical power and aberration characteristics of optical system 1 illustrated in FIG. 1.

| | First Group 100 | Second Group 200 | Third Group 300 |
|---|---|---|---|
| Optical Power | Positive | Positive | Positive |
| Petzval Curvature | Outward | Outward | Inward |
| Axial Chromatic Aberration | Overcorrected | Overcorrected | Undercorrected |

Figure 4:
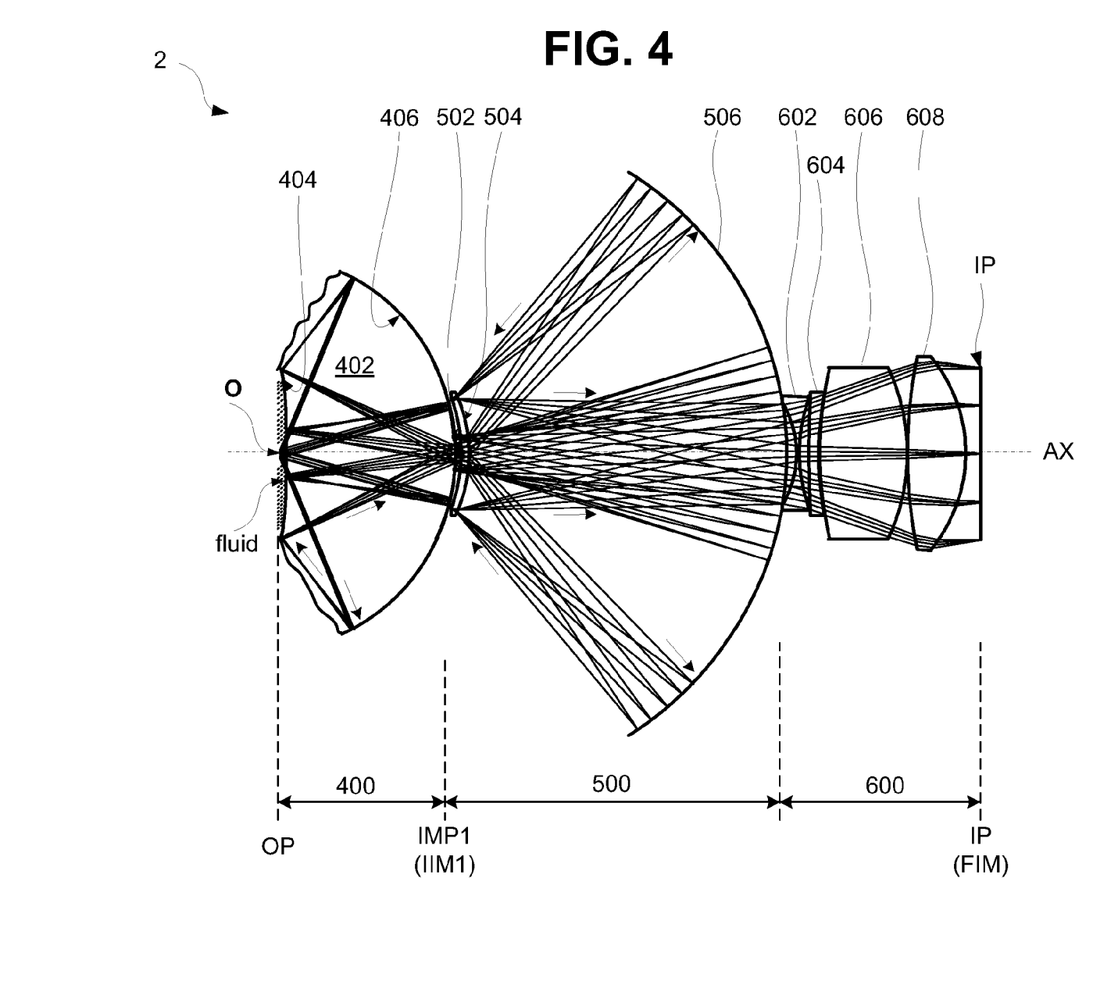
FIG. 4 illustrates an exemplary optical system including first, second and third optical groups, in accordance with a second aspect of the present invention.

FIG. 4 illustrates an optical system 2 that can be used as an objective optical system of a microscope in accordance with a second aspect of the present invention. The optical system 2 includes both reflective and refractive elements, i.e., it is a catadioptric optical system. Specifically, the optical system 2 included a first optical group 400, a second optical group 500 and a third optical group 600 aligned along an optical axis AX in order from the object side to the image side. The first optical group 400 is configured to form, at an intermediate image plane IMP1, an intermediate image IIM1 of an object O located at an object plane OP. The object O is disposed on the object side of the first optical group 400 at an appropriate distance (working distance) apart therefrom. An immersion fluid (fluid) is used to couple light originated at the object O to the optical system 2. Herein, "light originated at the object O" refers to illumination light that is either reflected from the object O or transmitted through and refracted by the object O. In either case, it should be understood that the light originated at the object O is collected by the first optical group 400. The second optical group 500 is configured to relay (receive and pass) the intermediate image IIM1 from the intermediate image plane IMP1 onto the third optical group 600. In relaying the intermediate image IIM1, the second optical group 500 may also magnify the intermediate image IIM1, if necessary. The third optical group 600 is configured to form a magnified final image FIM at a final imaging plane IP based on the intermediate image IIM1. Incidentally, it can be said that the first optical group 400, the second optical group 500 and the third optical group 600 are arranged in this order from the object side to the image side of the objective optical system 2. The terms "first", "second", "third", etc., as used herein, denote a relative position of the optical elements or groups thereof; and this relative position is defined by the order in which each optical group, optical element or surface thereof is arranged in order from the object plane OP to the final image plane IP.

The first optical group 400 consists of a solid lens 402 which has a first surface 404 and a second concave surface 406, respectively on the object side and image side thereof. The second optical group 500 includes a lens unit 502, at least one Mangin mirror 504, and a mirror 506. The lens unit 502 is disposed between the second surface 406 of the solid lens 402 and the Mangin mirror 504 (due to the ray-tracing, the lens unit 502 is not clearly shown in FIG. 4). The third optical group 600 includes a group of 4 lenses 602, 604, 606 and 608 aligned in this order from the object side to the image side.

Figure 5:
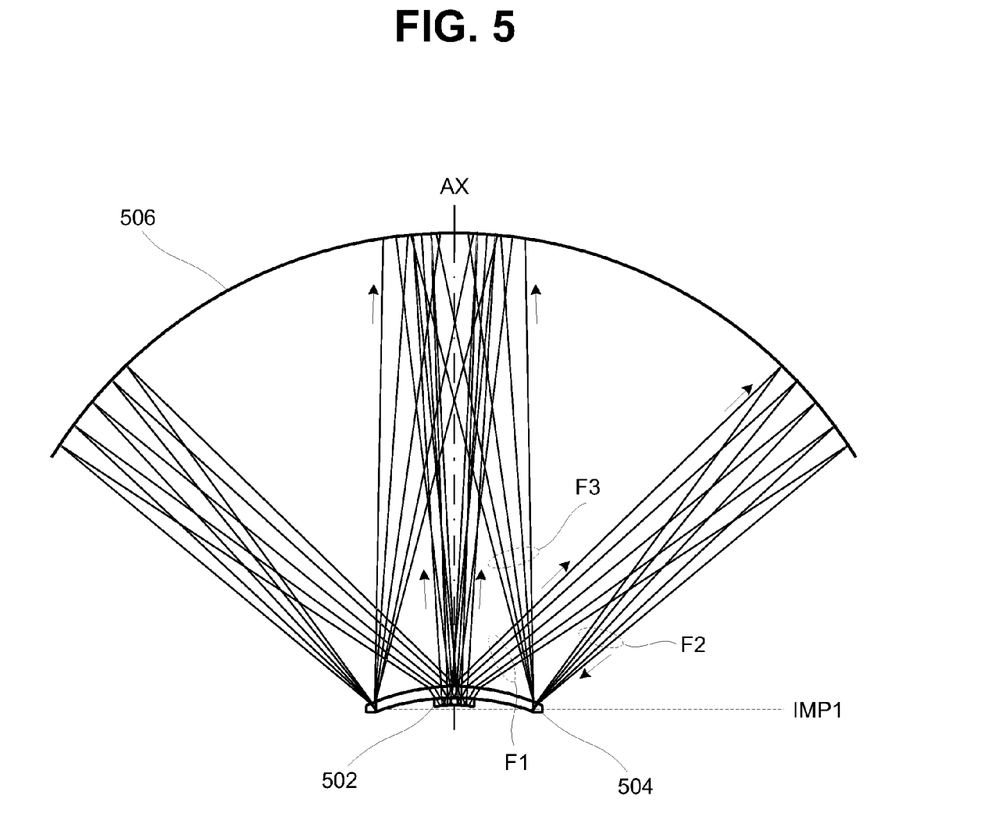
FIG. 5 illustrate an arrangement of the second optical group in the optical system, in accordance with the second aspect of the present invention.

FIG. 5 illustrates in more detail the structure and arrangement of the second optical group 500 of optical system 2. As illustrated in FIG. 5, the lens unit 502, the Mangin mirror 504, and the mirror 506 coaxially aligned along the optical axis AX. The lens 502 is located at, or in the vicinity of, the intermediate image plane IMP1 so that it can control the Petzval curvature. The Mangin mirror 504 may have a structure and function substantially similar to Mangin mirror 206 illustrated in FIG. 1 and described supra. The mirror 506 is preferably symmetric with respect to the optical axis AX and has a concave reflective surface facing towards the object side of the optical system.

The specific structure and function of each optical group in the optical system 2 will now be described in more detail. The first optical group 400 consisting of the solid lens 402 is substantially similar to the first optical group 100 illustrated in FIG. 1. That is, in operation, the first optical group 400 is configured to optimize the light-collecting capability of the optical system 2, by preventing total internal reflection (TIR) in the object space and providing a high numerical aperture equal to or greater than 1.65. More specifically, similar to the solid lens 102 of the optical system 1, each of the first surface 404 and the second surface 406 of the solid lens 402 respectively includes a transparent (transmissive) portion substantially centered on the optical axis thereof, and a reflective portion that concentrically surrounds the transparent portion. The reflective portions of the first and second surfaces of the solid lens 402 may be formed, for example, by selectively coating the areas of the solid lens desired to be reflective. In this manner, the solid lens 402 can be configured to collect light at a high Na through the transparent portions thereof, and to internally reflect the collected light within the reflective portions. Lenses having surfaces with coated reflective portions and transmitting (transparent) portions are considered to be well known to persons having ordinary skill in the art. Thus, specific details concerning coating materials or coating techniques are not discussed herein. Importantly, however, the reflective portions in the surfaces (404 and 406) of the solid lens 402 may preferably be designed to reflect light having a wavelength of approximately 400 to 700 nanometers. In addition, the solid lens 402 may operate either in dry or wet environments. For example, at least the first surface 404 of the solid lens 402 may be designed to work either exposed to the open environment (e.g., air) or submerged in an immersion fluid (e.g., oil). To that end, at least the reflective portion of the first surface 404 in solid lens 402 should be coated with a highly reflective material which material should be resistive to corrosion. A refractive index of the immersion fluid may preferably be selected to match as close as possible the refractive index of the transparent (trasmissive) region of the first surface 404. Therefore, the solid lens 402—with its first surface 404 being substantially planar and its second surface 406 being concave towards the object plane respectively having internal reflective regions therein—is formed a plano-convex lens which is configured to reflect the collected light at least twice thereinside and to generate the first intermediate image IIM1 with an outward Petzval curvature. This allows the optical system 2 to enhance its light capturing capability at the same time as to increase its objective FOV.

In the optical system 2 of FIG. 4, light originated at the object O is collected by the solid lens 402 and is reflected at least twice thereinside. That is, light originated at the object O passes through the transmissive portion of the first surface 404 and advances towards the second surface 406. At the second surface 406, in the reflective portion thereof, the collected light is reflected towards the first surface 404, wherefrom the collected light is again reflected towards the transmissive portion of the second surface 406. Substantially at the apex of the solid lens 402, or immediately near thereto, the light that has been reflected at least twice inside the solid lens 402 is combined to form the intermediate image IIM1. In other words, the first optical group 400 in FIG. 4 functions in a manner substantially similar to the first optical group 100 of FIG. 1. Thus, the manner in which the first optical group 400 collects light originated at the object O is similar to that illustrated in FIG. 3. Accordingly, the Petzval curvature and chromatic aberration in the first optical group 400 are substantially similar to that of the first optical group 100. Indeed, in accordance with Numerical Example 2 (see data in Table 5) and by using Equation (3), the Petzval sum of the first optical group 400 of the second embodiment was found to be −0.0036.

FIG. 5 illustrates an arrangement of the second optical group 500 in the optical system 2 of FIG. 4. As shown, the intermediate image IIM1 is formed, at the intermediate image plane IMP1, between the first optical group 400 and the second optical group 500. From the intermediate image plane IMP1, as shown in FIG. 5, the collected light passes through the lens unit 502 and advances through a hollow part of the Mangin mirror 504. Subsequently, the collected light F1 passing through the hollow part of the Mangin mirror 504 advances in the direction of the image plane, and is reflected by the concave surface of the mirror 506 towards the object side thereof as collected light F2. Then, the collected light F2 is reflected by the Mangin mirror 504 as collected light F3. Then, the collected light F3 reflected by the Mangin mirror 504 continues towards the image plane through a hollow portion (not shown) of the mirror 506. Finally, the collected light F3 passing through the hollow portion (in central region) of mirror 506 is received by the third optical group 600 and focused onto the imaging plane IP to form the final image FIM, as shown in FIG. 4.

Advantageously, in the first optical group 400, the immersion fluid used in the object space substantially matches the refractive index of the first surface 404 (solid lens 402) to thereby prevented TIR and increase NA. In addition, the concave shape of the second surface 406 serves to generate an outward Petzval curvature, and to intentionally generate overcorrected axial chromatic aberration. The second optical group 500, which comprises the first lens unit 502, the Mangin mirror 504 and the concave mirror 506, generates an inward Petzval curvature and undercorrected axial chromatic aberration. In the second optical group 500, in accordance with Numerical Example 2 (see data in Table 5) and by using Equation (3), the Petzval sum of was 0.0053.

The third optical group 600 includes a plurality of optical lenses (four shown in FIG. 4) and is configured to magnify the intermediate image IIM1 to form the final image FIM at the final imaging plane IP. The lenses in the third optical group 600 are not limited to any particular shape, number or order, but it is preferred that the third optical group 600 as a whole generates an outward Petzval curvature sufficient to correct the inward Petzval curvature generated by the second optical group 500. In addition, it is preferred that the third optical group 600 as a whole generates overcorrected axial chromatic aberration sufficient the balance and correct for the undercorrected axial chromatic aberration generated by the second optical group 500. Using the data of Numerical Example 2, and based on Equation (3), the Petval sum of the third optical group 600 was −0.0016.

In summary therefore, in the optical system 2, the first optical group 400 is configured to generate outward Petzval curvature and overcorrected axial chromatic aberration; the second optical group 500 is configured to generate inward Petzval curvature and undercorrected axial chromatic aberration; and the third optical group 600 is configured to generate outward Petzval curvature and overcorrected axial chromatic aberration. The relationship of each optical group of the optical imaging system 2 to Petzval curvature and axial chromatic aberration thereof is summarized in Table 2.

TABLE 2

Summary of characteristics of optical system 2 illustrated in FIG. 4.

|  | First Group 400 | Second Group 500 | Third Group 600 |
|---|---|---|---|
| Optical Power | Positive | Positive | Positive |
| Petzval Curvature | Outward | Inward | Outward |
| Axial Chromatic Aberration | Overcorrected | Undercorrected | Overcorrected |

Numerical Examples

Data corresponding to a numerical example (Numerical Example 1) representative of the optical system 1 illustrated in FIG. 1, and Data corresponding to a numerical example (Numerical Example 2) representative of the optical system 2 illustrated in FIG. 4 are next discussed. In each of the numerical examples presented herein, the reference indicia "i" (where i=1, 2, 3 . . . ) denotes the order of surfaces in the optical system from the object plane to the image plane. With this premise, the "Radius" data Ri corresponds to an $i^{th}$ radius of curvature (at the $i^{th}$ plane); thickness Ti denotes an on-axis distance or space between the ith and $(i+1)^{th}$ surface; the reference ndi and vdi respectively denote the index of refraction and Abbe number of the material of the $i^{th}$ optical element with respect to the Fraunhoffer d-line. A surface number without data for ndi and vdi indicates that this surface number represents an air space. In Table 3, a radius R=1.00E+18 (where 1E+X is equivalent to $1 \times 10^{+X}$) denotes a substantially infinite radius, i.e., a flat surface. In addition, in each numerical example, it is assumed that the object O is located on the object side of the first optical surface and at an object plane OP. An stop STO is located at a relative far distance from object O to make telecentricity in the object space. In each numerical example, the object O is considered to be immersed in a fluid with a refractive index matching the refractive index of the first optical surface (i.e., matching the refractive index of solid lens 102 in numerical example 1 and matching the refractive index. of solid lens 402 in numerical example 2). Where present, aspherical surfaces are denoted by an asterisk ("*") added next to the surface number.

In each aspheric surface, a conic constant is denoted by k; aspherical order coefficients are denoted by A, B, C, D, E, F, G, J . . . which are $4^{th}$, $6^{th}$, $8^{th}$, $10^{th}$, $12^{th}$, $14^{th}$ and $16^{th}$ order coefficient respectively; and a displacement in the direction of the optical axis at a position of height h from the optical axis is denoted by z with reference to an apex of the surface. The displacement in the aspherical surface is based on Equation (6) given below:

$$z = \frac{ch^2}{1 + \sqrt{1-(1+k)c^2h^2}} + Ah^4 + Bh^6 + Ch^8 + Dh^{10} + Eh^{12} + Fh^{14} + Gh^{16} + Hh^{18} + Jh^{20} + \ldots \quad \text{Equation (6)}$$

A summary of parameters of the optical components in the Numerical Example 1 corresponding to the optical system 1 is tabulated in Table 3. A summary of data for aspherical surface in the numerical example corresponding to the optical system 1 is tabulated in Table 4. Similarly, a summary of parameters of the optical components in the Numerical Example 2 corresponding to the optical system 2 is tabulated in Table 5. A summary of data for aspherical surfaces in the numerical example corresponding to the optical system 2 is tabulated in Table 6. Where appropriate and pertinent, data corresponding to parameters of the optical components are given in millimeters (mm).

TABLE 3 parameters of the optical components corresponding to optical system 1 (FIG. 1).

| Surface No. | R | T | nd | vd |
|---|---|---|---|---|
| 1 | 1.00E+18 | 1.376464 | 1.773 | 49.56 |
| 2* | 742.5203 | 90.62379 | 1.773 | 49.56 |
| 3* | −130.353 | −90.6238 | 1.773 | 49.56 |
| 4* | 742.5203 | 90.62379 | 1.773 | 49.56 |
| 5* | −130.353 | 0.698887 |  |  |
| 6* | 10150.05 | 41.43287 | 1.516 | 64.15 |
| 7 | −150.18 | 49.83028 |  |  |
| 8 | −76.5665 | 10.63516 | 1.516 | 64.15 |
| 9* | −111.791 | −10.6352 | 1.516 | 64.15 |
| 10 | −76.5665 | −49.8303 |  |  |

TABLE 3-continued parameters of the optical components corresponding to optical system 1 (FIG. 1).

| | | | | |
|---|---|---|---|---|
| 11 | −150.18 | −41.4329 | 1.516 | 64.15 |
| 12* | 10150.05 | 41.43287 | 1.516 | 64.15 |
| 13 | −150.18 | 49.83028 | | |
| 14 | −76.5665 | 10.63516 | 1.516 | 64.15 |
| 15* | −111.791 | 0.5 | | |
| 16 | −107.95 | 4.132365 | 1.487 | 70.41 |
| 17* | −40.3865 | 0.5 | | |
| 18 | 30.54636 | 6.077561 | 1.620 | 60.32 |
| 19 | 50.73489 | 0.563807 | | |
| 20* | 51.75696 | 3.029987 | 1.722 | 46.71 |
| 21 | 34.5069 | 1.159029 | | |
| 22 | 51.60161 | 8.449312 | 1.488 | 70.33 |
| 23 | −25.3601 | 1.067415 | | |
| 24 | −23.0756 | 13.83235 | 1.755 | 27.58 |
| 25 | −30.7272 | 8.569395 | | |
| 26 | 29.16109 | 13.52291 | 1.534 | 61.32 |
| 27 | 220.8779 | 2.745447 | | |
| 28 | 43.08408 | 10.61782 | 1.504 | 61.77 |
| 29 | 4710.273 | 4.64906 | | |
| 30 | −36.8797 | 17.26118 | 1.565 | 43.89 |
| 31* | −28.8942 | 3.623706 | | |
| 32 | −22.8751 | 32.12814 | 1.755 | 27.58 |
| 33* | −47.9345 | 0.5 | | |
| 34 | 69.46939 | 16.00094 | 1.620 | 60.32 |
| 35 | −181.14 | 30.99323 | | |
| 36 | −46.7773 | 3 | 1.630 | 58.55 |
| 37 | −202.55 | 8.288119 | | |
| 38* | −42.9434 | 3 | 1.755 | 27.58 |
| 39 | −709.923 | 12.99908 | | |
| 40 | −43.0628 | 40.07029 | 1.755 | 27.58 |
| 41* | −57.5247 | 19.32096 | | |
| 42 | 205.7798 | 28.80044 | 1.487 | 70.41 |
| 43* | 738.5729 | 10 | | |
| IM | 1.00E+18 | 0 | | |

Other data

| Group Number | Optical Power | Petzval Sum |
|---|---|---|
| First Group 100 | 0.015 | −0.0068 |
| Second Group 200 | 0.015 | −0.0053 |
| Third Group 300 | 0.025 | 0.0120 |

TABLE 5 parameters of the optical components corresponding to optical system 2 (FIG. 4).

| Surface | R | T | nd | vd |
|---|---|---|---|---|
| 1 | 1.00E+18 | 5.215901 | 1.773 | 49.56 |
| 2* | −3721.31 | 132.6142 | 1.773 | 49.56 |
| 3* | −178.557 | −132.614 | 1.773 | 49.56 |
| 4* | −3721.31 | 132.6142 | 1.773 | 49.56 |
| 5* | −178.557 | 0.538975 | | |
| 6 | −175.492 | 3 | 1.744 | 44.79 |
| 7 | 12245.8 | 0.966191 | | |
| 8* | −146.6 | 6.05406 | 1.678 | 50.72 |
| 9 | −129.414 | 248.833 | | |
| 10* | −285.22 | −248.833 | | |
| 11 | −129.414 | −6.05406 | 1.678 | 50.72 |
| 12* | −146.6 | 6.05406 | 1.678 | 50.72 |
| 13 | −129.414 | 248.833 | | |
| 14* | −285.22 | 7.794303 | | |
| 15* | −84.6038 | 3 | 1.720 | 43.69 |
| 16 | 149.2195 | 6.650545 | | |
| 17 | 1216.367 | 7.304322 | 1.762 | 26.52 |
| 18 | 334.6209 | 0.5 | | |
| 19 | 321.9491 | 69.43891 | 1.738 | 32.26 |
| 20 | −178.102 | 0.5 | | |
| 21 | 458.097 | 45.6239 | 1.519 | 64.48 |
| 22 | −130.776 | 0 | | |
| 23 | 1.00E+18 | 11.96577 | | |
| IM | 1.00E+18 | 0 | | |

Other data

| Group Number | Optical Power | Petzval Sum |
|---|---|---|
| First Group 400 | 0.012 | −0.0036 |
| Second Group 500 | 0.017 | 0.0053 |
| Third Group 600 | 0.0032 | −0.0016 |

TABLE 4

Data of aspherical surfaces in optical system 1 (FIG. 1)

| Surface | k | A | B | C | D | E | F | G |
|---|---|---|---|---|---|---|---|---|
| 3.5 | 3.29E−01 | 9.27E−09 | 7.90E−14 | 1.64E−17 | −2.18E−21 | 4.40E−25 | −3.44E−29 | 1.51E−33 |
| 2.4 | 0.00E+00 | −1.58E−07 | −1.39E−11 | −1.84E−15 | −3.90E−19 | 3.34E−23 | −7.92E−27 | −2.43E−30 |
| 9.15 | 0.00E+00 | 8.30E−09 | 1.03E−12 | 9.64E−17 | 8.10E−21 | 2.35E−24 | −2.67E−28 | 3.69E−32 |
| 6.12 | 0.00E+00 | −3.76E−08 | 7.87E−14 | 1.55E−15 | −8.36E−20 | −1.91E−22 | 7.56E−26 | −9.37E−30 |
| 17 | 0.00E+00 | 4.63E−06 | −4.86E−09 | 8.88E−12 | 4.38E−15 | −1.44E−36 | −2.00E−36 | 0.00E+00 |
| 20 | 0.00E+00 | −3.72E−06 | −1.53E−08 | 2.86E−11 | −3.30E−14 | 4.32E−35 | 2.33E−34 | 0.00E+00 |
| 31 | 0.00E+00 | 2.39E−06 | 1.72E−09 | 6.46E−13 | −2.49E−15 | 1.10E−35 | −1.17E−33 | 0.00E+00 |
| 33 | 0.00E+00 | 8.90E−08 | 1.03E−10 | 7.18E−14 | 3.02E−17 | −1.79E−31 | 2.80E−23 | 0.00E+00 |
| 38 | 0.00E+00 | −5.16E−07 | −7.62E−10 | 3.07E−14 | 1.61E−16 | −1.08E−33 | −1.97E−32 | 0.00E+00 |
| 41 | 0.00E+00 | 9.40E−08 | −4.79E−11 | 2.34E−14 | −1.69E−17 | 6.88E−21 | −1.06E−24 | 0.00E+00 |
| 43 | 0.00E+00 | −6.61E−07 | 2.93E−11 | 3.29E−15 | −3.55E−18 | 8.01E−22 | −5.38E−26 | 0.00E+00 |

TABLE 6

Data of aspherical surfaces in optical system 2 (FIG. 4)

| Surface | k | A | B | C | D | E | F | G |
|---|---|---|---|---|---|---|---|---|
| 3.5 | 0.00E+00 | −9.17E−08 | −1.76E−12 | −3.30E−15 | 1.49E−18 | −4.11E−22 | 5.74E−26 | −3.46E−30 |
| 2.4 | 0.229185 | 2.34E−09 | 3.69E−14 | −1.23E−18 | 2.23E−22 | −8.33E−27 | 1.42E−31 | 2.17E−36 |
| 8.12 | 0.00E+00 | −5.38E−08 | −2.44E−11 | 4.32E−14 | −4.51E−17 | 2.46E−20 | −6.93E−24 | 7.87E−28 |
| 10.14 | 7.66E−02 | 1.25E−10 | 1.14E−15 | 3.02E−20 | −5.90E−25 | 1.31E−29 | −9.44E−35 | 3.79E−40 |
| 15 | 0.00E+00 | 1.55E−07 | −1.16E−11 | −1.41E−15 | 5.95E−19 | 0.00E+00 | 0.00E+00 | 0.00E+00 |

Figure 6A:
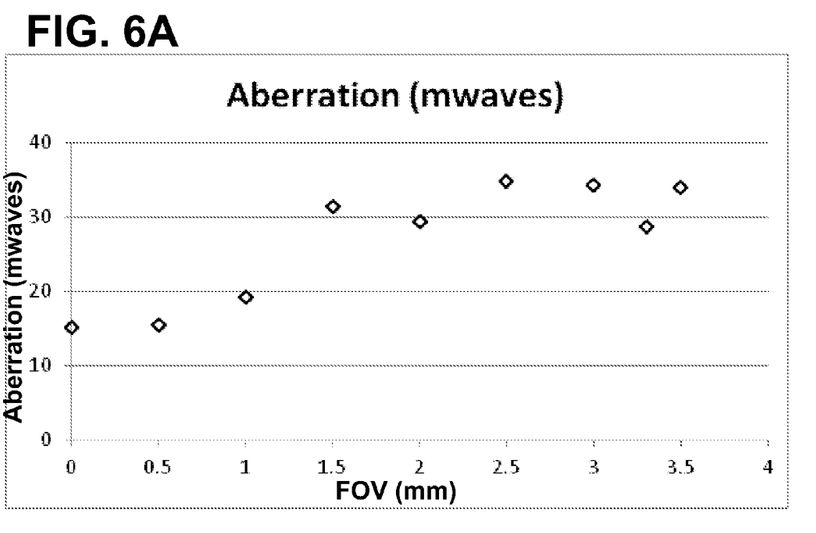
FIG. 6A and FIG. 6B are each a graphical plot of RMS wavefront error across the FOV of the exemplary optical system in accordance with the first and second aspects of the present invention, respectively.
Figure 6B:
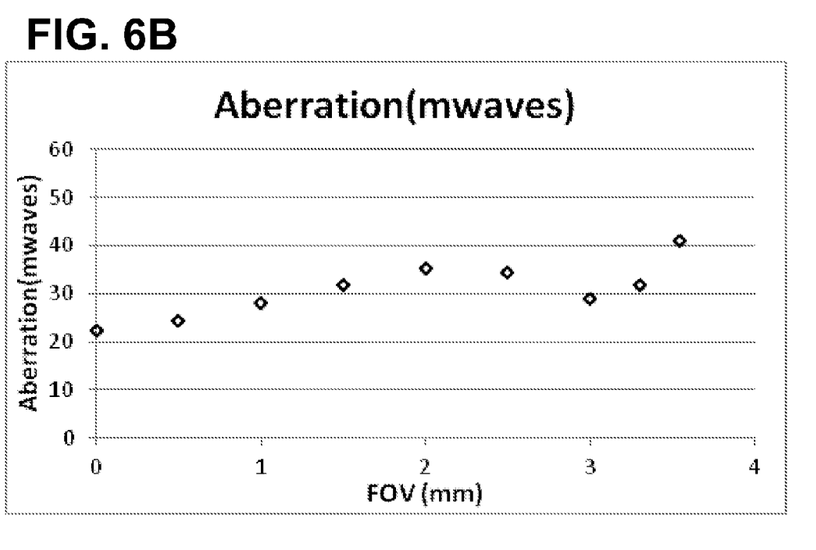

FIG. 6A illustrates a plot of RMS (root mean square) wavefront error across the FOV of the exemplary optical system 1, in accordance with the present invention. FIG. 6B illustrates a plot of RMS wavefront error across the FOV of the optical system 2, in accordance with the present invention. In general, the definition of the RMS wavefront error is understood as the standard deviation of the optical path differences (OPDs) of an actual aberrated wavefront as measured from a best-fit reference spherical wavefront over the total wavefront area. More specifically, the wavefront RMS error represents the square root of an effective averaging of the peak-to-valley differences in the optical path of an actual aberrated wavefront as compared to a reference paraxial spherical wavefront. In lens design, the standard deviation of wavefront error is referred to as RMS wavefront error; and this RMS wavefront error is given by the following Equation (7).

$$RMS_{sd} = \sqrt{\frac{\sum_i (W_i - W_{mean})^2}{N}} \quad \text{Equation (7)}$$

where Wi is optical path difference and Wmean is the mean optical path difference.

In the present case, as illustrated in FIGS. 6A and 6B, the RMS wavefront error indicates a maximum wavefront deviation of 35 mwaves across the FOV of the optical system 1 (FIG. 6A), and a maximum wavefront error of 40 mwaves across the FOV of the optical system 2 (FIG. 6B). The data plotted in FIGS. 6A and 6B correspond to results obtained from optical system 1 (FIG. 1) and optical system 2 (FIG. 4), where the focal length was 550 mm, and the wavelength bandwidth in the range of 400 to 700 nm. Obscuration was 0.3. All other values used for the results plotted in FIGS. 6A and 6B were obtained from the data tabulated in Numerical Examples 1 and 2, respectively.

Figure 7:
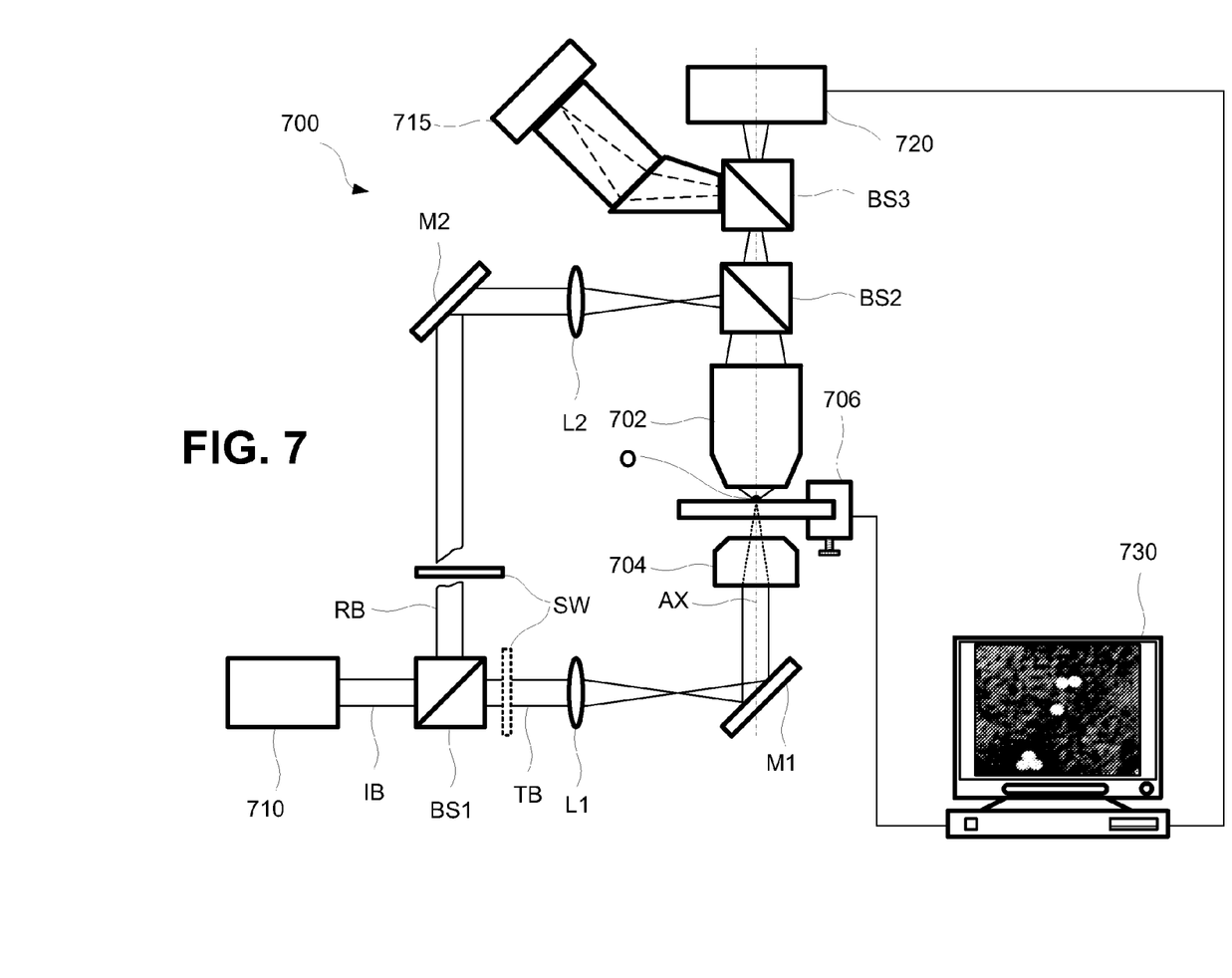
FIG. 7 is a schematic view illustrating main components of an upright microscope, as an example of an image pickup apparatus, using an optical system in accordance with the present invention.

Next, an example where the optical system according to at least one exemplary embodiment of the present invention is applied to a microscope (an example of image pickup apparatus) is described with reference to FIG. 7. FIG. 7 is a schematic view illustrating main components of an exemplary upright microscope 700 configured to image an object O with transmitted light, reflected light, or both. As illustrated in FIG. 7, the exemplary microscope 700 includes a sample holder 706, a light source 710, a condenser lens 704, an eyepiece 715, an electronic optical detector 720, and an objective optical system 702 in accordance with at least one embodiment of the present invention. A computer system 730 may be operatively connected to the sample holder 706 and the electronic optical detector 720. The computer system 730 performs computer-controlled data acquisition and storage. In the computer system 730, specialized software is used to fit the data, make various calculations, and display the data in graphical format. The electronic optical detector 720 may include a CCD (charged coupled device) sensor array or a CMOS (complementary metal oxide semiconductor) sensor array. The light source 710 may include either a coherent light source, such as a continuous-wave or pulsed laser, or an incoherent light source such as a tungsten or mercury lamp. The light source is not limited to light source that emits visible light, but it can include light sources that can include ultraviolet (UV), deep UV (DUV), infrared (IR), near IR (NIR) and others.

In operation, the object O is arranged along an optical axis AX of the objective optical system 702, and is preferably immersed in a fluid substance (immersion medium), such as water, oil, glycerol or the like. The light source 710 generates an illumination beam IB. A beam splitter BS 1 separates the illumination beam IB into a transmitted illumination beam BT and a reflected illumination beam BR. When necessary, a switch SW (optical or electronic) may control whether the transmitted illumination beam TB or the reflected illumination beam RB is used to illuminate the object O. Alternatively, the transmitted illumination beam TB and the reflected illumination beam RB may be generated separately with different light sources. When the transmitted illumination beam TB is used, light travels through a lens L1, reflects on a mirror M1, and is focused onto the object O by passing through the condenser lens 704. When the reflected illumination beam RB is used, light is reflected on a mirror M2, travels through lens L2, and a beam splitter BS2 reflects the light of the beam RB towards the object O. In this case, the light of the beam RB travels through the objective optical system 702 to be focused onto the object O. Light beams originating at object O are collected by the objective optical system 702 and an image of the object O is formed in the manner described above, in accordance with the optical system employed. Light collected by the objective optical system 702 travels through the beam splitter BS2 and advances to the beam splitter BS3. The beam splitter BS3 guides light to the eyepiece 715 and the electronic optical detector 720. In this manner, the final image FIM is either observed at the eyepiece 715 or is detected by the optical detector 720.

Those skilled in the art will appreciate that many variations are possible within the scope of the examples described herein. Thus, while the features of the invention have been described with reference to particular embodiments, it will be understood that structural and functional modifications may be made without departing from the scope of the following claims.

What is claimed is:
1. An optical system comprising:
    a first optical group configured to form a first intermediate image of an object;
    a second optical group and a third optical group configured to form an object image based on the first intermediate image, wherein the first, second and third optical groups are arranged in order along an optical path between an object side and an image side of the optical system, wherein the first optical group consists of a solid lens configured to collect light from the object by reflecting the light inside the solid lens at least twice, and wherein the second optical group includes at least one mangin mirror and the third optical group includes a plurality of lenses.

2. The optical system according to claim 1, wherein the solid lens has a first surface and a second surface being concave towards the first surface.

3. The optical system according to claim 1, wherein the second optical group includes two mangin mirrors and a lens group, at least one of the two mangin mirrors having a concave surface facing towards the object.

4. The optical system according to claim 3, wherein the lens group in the second optical group is configured to form a second intermediate image based on the first intermediate image, and wherein the third optical group is configured to form the object image based on the second intermediate image.

5. The optical system according to claim 1, wherein the second optical group includes one mangin mirror and a concave mirror having a hollow portion in an axial region of the concave mirror, and wherein the one mangin mirror and the concave mirror are arranged in order along the optical path between the object side and the image side.

6. The optical system according to claim 5, wherein the second optical group is configured to relay the light from the solid lens to the third optical group, and wherein the third optical group focuses the light from the second optical group to form the object image.

7. The optical system according to claim 6, wherein the light from the solid lens is first reflected by the concave mirror towards the one mangin mirror, then the light is reflected by the one mangin mirror towards the hollow portion of the concave mirror and the light transmits through the hollow portion of the concave mirror.

8. The optical system according to claim 1, wherein the second optical group includes an aspherical surface.

9. The optical system according to claim 1, wherein the object is imaged with light having an approximate wavelength range from 400 nanometers to 700 nanometers.

10. The optical system according to claim 1, wherein:
each of the first, second and third optical groups has a positive refractive power,
the first optical group generates outward Petzval curvature and overcorrected axial chromatic aberration, and one of the second and third optical groups generates outward Petzval curvature and overcorrected axial chromatic aberration, and the other one of the second and third optical groups generates inward Petzval curvature and undercorrected axial chromatic aberration.

11. The optical system according to claim 1, wherein a numerical aperture of the optical system is equal to or more than 1.3 and a field of view is equal to or more than 6 mm.

12. The optical system according to claim 2, wherein, in the solid lens, light from the object is first reflected by the second surface towards the first surface, and wherein the first surface reflects the light from the object towards the image side to form the first intermediate image.

13. The optical system according to claim 1, wherein the second optical group includes a first mangin mirror having a transmissive portion provided in an axial region and a reflective portion provided on a surface at an object side and includes a second mangin mirror having a transmissive portion provided in an axial region and a reflective portion provided on a surface at an image side, and wherein the light from the solid lens is relayed to the third optical group after penetrating the transmitting portion of the first mangin mirror, the reflecting portion of the second mangin mirror, the reflecting portion of the first mangin mirror and the transmitting portion of the second mangin mirror in order.

14. An image pickup apparatus, comprising:
an optical system; and
a detector configured to detect light from the optical system,
wherein the optical system comprises:
a first optical group configured to form a first intermediate image of an object;
a second optical group and a third optical group configured to form an object image based on the first intermediate image,
wherein the first, second and third optical groups are arranged in order along an optical path between an object side and an image side of the optical system,
wherein the first optical group consists of a solid lens configured to collect light from the object by reflecting the light inside the solid lens at least twice, and
wherein the second optical group includes at least one mangin mirror and the third optical group includes a plurality of lenses.

* * * * *